United States Patent
Okoshi et al.

(10) Patent No.: US 8,904,855 B2
(45) Date of Patent: Dec. 9, 2014

(54) DEVICE AND METHOD FOR OIL PRESSURE SENSOR FAULT SENSING FOR VEHICLE

(75) Inventors: Satoru Okoshi, Wako (JP); Kenichi Machida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 13/526,848

(22) Filed: Jun. 19, 2012

(65) Prior Publication Data

US 2013/0008244 A1    Jan. 10, 2013

(30) Foreign Application Priority Data

Jun. 21, 2011    (JP) .................................. 2011-137384

(51) Int. Cl.
| | | |
|---|---|---|
| G01M 15/09 | (2006.01) | |
| F02D 41/22 | (2006.01) | |
| F02D 41/04 | (2006.01) | |
| F02D 41/26 | (2006.01) | |

(52) U.S. Cl.
CPC ............ *F02D 41/222* (2013.01); *F02D 41/042* (2013.01); *F02D 2200/501* (2013.01); *F02D 41/26* (2013.01); *Y02T 10/40* (2013.01); *F02D 2200/024* (2013.01)
USPC ........................... 73/114.57; 340/451; 701/36

(58) Field of Classification Search
CPC ................................................ F02D 2200/024
USPC ........................... 73/114.57; 701/36; 340/451
See application file for complete search history.

(56) References Cited

U.S. PATENT DOCUMENTS

| | | | | |
|---|---|---|---|---|
| 4,888,576 | A * | 12/1989 | Kubota et al. ................. | 340/451 |
| 5,317,998 | A * | 6/1994 | Hanson et al. ............. | 123/179.4 |
| 7,500,936 | B2 * | 3/2009 | Sato et al. ........................ | 477/97 |
| 2007/0049457 | A1 * | 3/2007 | Sato et al. ........................ | 477/97 |
| 2008/0170815 | A1 | 7/2008 | Murabe et al. | |
| 2014/0148991 | A1 * | 5/2014 | Park et al. ..................... | 701/31.1 |

FOREIGN PATENT DOCUMENTS

| | | |
|---|---|---|
| CN | 1751930 A | 3/2006 |
| JP | 3489548 B2 | 1/2004 |

* cited by examiner

*Primary Examiner* — Hezron E Williams
*Assistant Examiner* — Nathaniel Kolb
(74) *Attorney, Agent, or Firm* — Squire Patton Boggs (US) LLP

(57) ABSTRACT

A fault sensing device for a vehicle includes a time measuring section functioning as a sleep mode while power to a controller is off. The time measuring section can measure a stop time of an engine, and can transmit information on the stop time to the controller when power to the controller is on. When the controller determines that a stop time of the engine is a predetermined time, the controller performs fault sensing for an oil pressure switch.

7 Claims, 5 Drawing Sheets

DEVICE AND METHOD FOR OIL PRESSURE SENSOR FAULT SENSING FOR VEHICLE

BACKGROUND

1. Field

The present invention relates to a device and a method for oil pressure sensor fault sensing for a vehicle.

2. Description of Related Art

There is conventionally an electronic control unit (ECU) for engine control, which controls the operation of an internal combustion engine as a driving source of a vehicle. The electronic control unit includes a microcomputer (CPU) supplied with battery power according to an on/off operation of an ignition switch (main switch), and a time measuring section for measuring time. The time measuring section has an auxiliary power supply not involved in the turning on/off of the ignition switch. The elapsed time of an engine stop duration is measured, the time of the engine stop duration is read from the time measuring section after the microcomputer is started, and the time is used to determine whether a water temperature sensor is faulty see, for example, Japanese Patent Number 3489548 (Patent Document 1).

A constitution similar to the above constitution is considered for fault sensing for an oil pressure sensor system essential to an ordinary internal combustion engine. Break or failure detection for an oil pressure sensor system in such an oil warning system is made possible by monitoring a normally closed oil pressure sensor during an engine stop (oil pressure absence state).

However, the above constitution has the time measuring section within the ECU, and has the auxiliary power supply as a continuous power supply to measure the time of an engine stop duration. Thus, the number of parts within the ECU is increased, which leads to an increase in cost.

SUMMARY

It is accordingly an object of the present invention to enable rapid sensing of a fault in an oil pressure sensor system after a start of an engine while suppressing an increase in the number of parts of an ECU in a device and a method for oil pressure sensor fault sensing for a vehicle.

As means for solving the above problems, according to an embodiment of the invention, there is provided an oil pressure sensor fault sensing device for a vehicle. The oil pressure sensor fault sensing device can include an oil pressure sensor for detecting an oil pressure of an engine oil of an internal combustion engine as a driving source of the vehicle. An ECU is configured to control operation of the internal combustion engine. The ECU can perform fault sensing for the oil pressure sensor. A time measuring section functions as a sleep mode, even while power to the ECU is off. The time measuring section is configured to measure a stop time of the internal combustion engine during the sleep mode, and transmits information on the stop time to the ECU when the power to the ECU is turned on. When the ECU determines that the stop time of the internal combustion engine is a predetermined time or more on a basis of the information from the time measuring section to perform the fault sensing for the oil pressure sensor in a state of the internal combustion engine not generating an oil pressure, the ECU performs the fault sensing for the oil pressure sensor.

According to another embodiment of the invention, the ECU can perform the fault sensing for the oil pressure sensor when determining that vehicle speed is absent during the stop time of the internal combustion engine.

According to another embodiment of the invention, the ECU can perform the fault sensing for the oil pressure sensor when determining that information transmission from the time measuring section is a first transmission after the internal combustion engine is started.

According to another embodiment of the invention, the oil pressure sensor fault sensing device for the vehicle further includes an engine stop switch for only stopping the internal combustion engine. The engine stop switch can be disposed separately from a main switch. The ECU can stop the fault sensing for the oil pressure sensor at a time of an engine restart immediately after an engine stop is effected by the engine stop switch.

According to another embodiment of the invention, there is provided an oil pressure sensor fault sensing method for a vehicle. The method can perform fault sensing for an oil pressure sensor for detecting an oil pressure of an engine oil of an internal combustion engine as a driving source of the vehicle by an ECU for controlling operation of the internal combustion engine. The oil pressure sensor fault sensing method can include measuring a stop time of the internal combustion engine during a sleep mode and transmitting information on the stop time to the ECU when power to the ECU is turned on, by a time measuring section functioning as the sleep mode even while the power to the ECU is off. When the ECU determines that the stop time of the internal combustion engine is a predetermined time or more on a basis of the information from the time measuring section to perform the fault sensing for the oil pressure sensor in a state of the internal combustion engine not generating an oil pressure, the ECU performs the fault sensing for the oil pressure sensor.

According to another embodiment of the invention, the ECU performs the fault sensing for the oil pressure sensor when determining that vehicle speed is absent during the stop time of the internal combustion engine.

According to certain embodiments of the invention, in a vehicle having the time measuring section that originally has a sleep mode function, the time measuring section always performs time measurement. Therefore the power OFF time of the ECU, the stop time of the engine or a time during which no oil pressure is generated, can be measured without increasing parts and the like. Thus, even when the ECU does not have a dedicated time measuring section or a dedicated power supply for measuring the stop time of the engine, the stop time of the engine can be measured accurately, and a state in which no oil pressure remains can be sensed. Thus, the fault sensing for the oil pressure sensor can be performed immediately after the engine is restarted, and a result of fault determination can be notified to a user.

According to certain embodiments of the invention, when the vehicle runs by inertia or the like in an in-gear state, for example, an oil pressure is generated even during the stop time of the internal combustion engine. However, fault determination for the oil pressure sensor can be made correctly by performing the fault sensing only when it is determined that vehicle speed is absent during the stop time of the internal combustion engine.

According to certain embodiments of the invention, when information at a time of a previous engine stop is erroneously transmitted to the ECU at a time of a restart after an engine stop not involving an operation of turning off the main switch, for example, correct fault sensing cannot be performed, but fault determination for the oil pressure sensor can be made correctly by avoiding the fault sensing when the information transmission from the time measuring section is not a first transmission.

According to certain embodiments of the invention, information at a time of a previous engine stop is prevented from being erroneously transmitted to the ECU at a time of a restart after an engine stop by the engine stop switch which engine stop does not involve an operation of turning off the main switch. Thus, fault determination for the oil pressure sensor can be made correctly.

DETAILED DESCRIPTION

Embodiments of the present invention will hereinafter be described with reference to the drawings.

Figure 1:
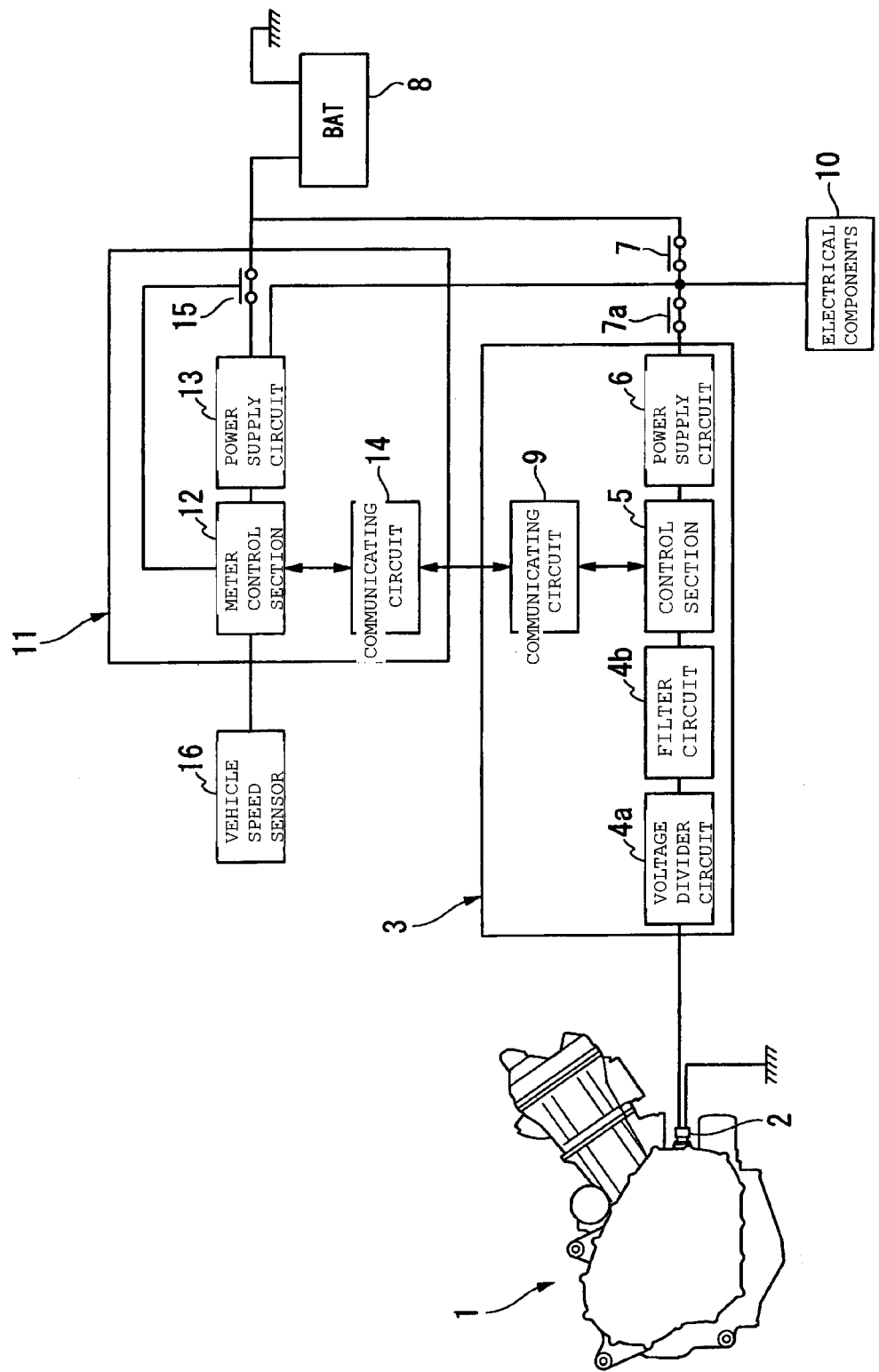
FIG. 1 is a block diagram of an oil warning system in an embodiment of the present invention.

In FIG. 1, a reference numeral 1 indicates an engine such as an internal combustion engine, as a motor of a vehicle such as a motorcycle, for example. The engine 1 has an oil pressure switch or oil pressure sensor 2 for detecting the oil pressure on an oil pump discharge side of an engine oil circulating in the inside of the engine 1. The oil pressure switch 2 is connected to an ECU (electronic control unit) 3 for controlling the operation of the engine 1. A detection signal of the oil pressure switch 2 goes through input circuits such as a voltage divider circuit 4a and a filter circuit 4b within the ECU 3, and is thereafter input to a control section 5 including a CPU (Central Processing Unit) to be subjected to A/D conversion. A power supply circuit 6 within the ECU 3 is connected with a battery 8 as a vehicle-mounted power supply via an ignition switch or main switch 7. The ignition switch 7 makes and breaks electric connection between the battery 8 and the ECU 3, a meter ECU 11, and various electrical components 10. Incidentally, a reference 7a in FIG. 1 indicates a kill switch or engine stop switch for making and breaking only the electric connection between the battery 8 and the ECU 3.

The ECU 3 can communicate bidirectionally with the meter ECU 11 of a meter device 20 (see FIG. 2) via a serial communication circuit 9. The oil pressure switch is of a normally closed type, and is closed when the oil pressure within the engine 1 is equal to zero which is equal to atmospheric pressure.

The meter ECU 11 includes a meter control section 12, a power supply circuit 13, and a serial communication circuit 14, and includes a self-sustaining power supply circuit 15 for a sleep mode, which is a low power consumption mode during the OFF state of the ignition switch 7. Thereby, the operation of a time display part 24 and the like of the meter device 20 is secured, and various kinds of information used to sense a break or failure in an oil warning system of the engine 1, such as sense a break in the system of the oil pressure switch 2, for example, are obtained. Incidentally, a reference numeral 16 in FIG. 1 indicates a vehicle speed sensor connected to the meter ECU 11.

Figure 2:
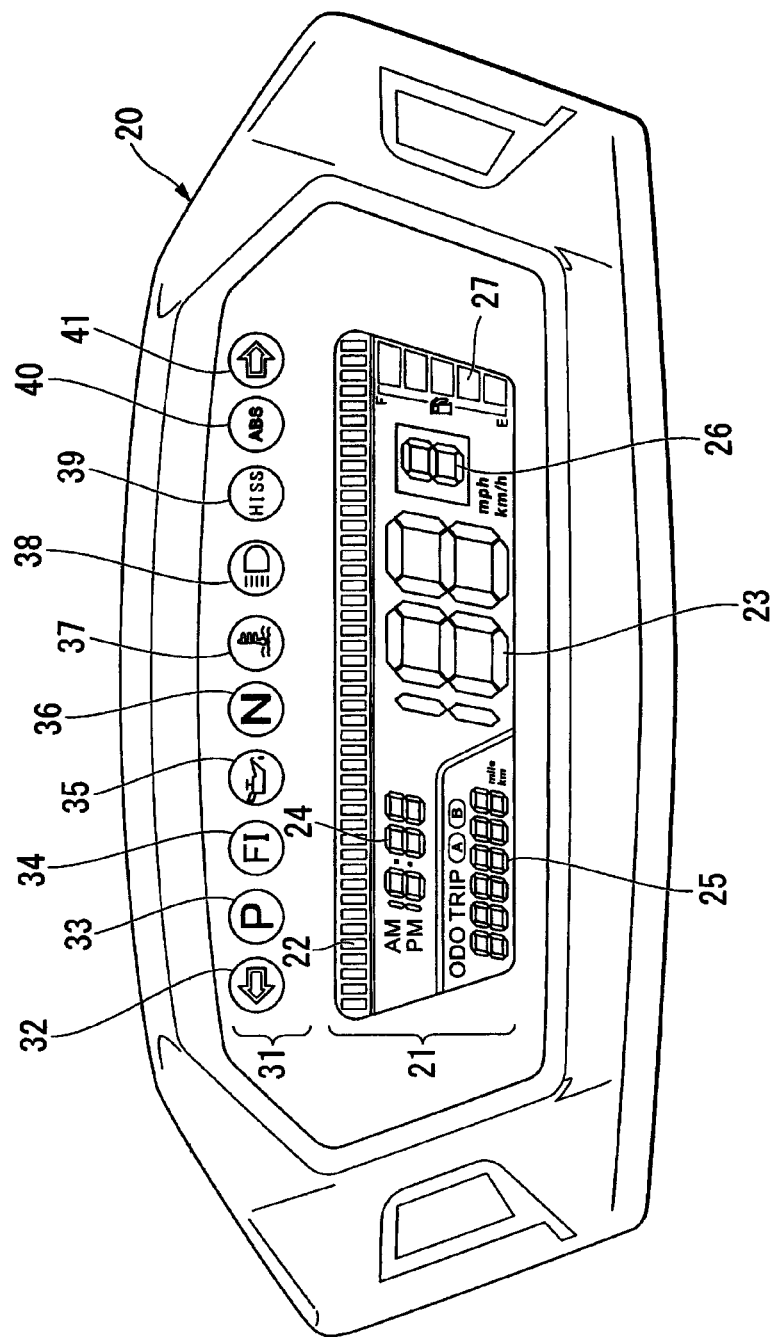
FIG. 2 is a front view of a meter device in the oil warning system.

As shown in FIG. 2, the meter device 20 of the vehicle includes an information display section 21 composed of, for example, an LCD (Liquid Crystal Display) disposed in substantially a center of a front surface of a housing of the meter device 20 and an indicator lamp group 31 disposed above the information display section 21.

The information display section 21 can include a bar type tachometer 22 disposed in an upper part of the information display section 21, and a digital vehicle speed meter 23 disposed below the tachometer 22. A digital time display part 24 is disposed on an upper left side of the vehicle speed meter 23, and a digital travel distance display part 25 is disposed on a lower left side of the vehicle speed meter 23. A gear position display part 26 is disposed on a right side of the vehicle speed meter 23, and a bar type remaining fuel display part 27 is disposed on a right side of the gear position display part 26.

The indicator lamp group 31 can include, in order from a left, a left direction indicator lamp 32 configured to blink at a time of operation of a left direction indicator, and a parking lamp 33 configured to illuminate at a time of operation of a parking brake. An FI lamp 34 is configured to illuminate at a time of an abnormality of a fuel injection device or the like, and an oil pressure warning lamp 35 is configured to illuminate at a time of a decrease in the pressure of the engine oil or the like. A neutral lamp 36 is configured to illuminate at a time that a transmission is in neutral. A water temperature warning lamp 37 is configured to illuminate at a time of a high temperature of a cooling water (117° C. to 121° C.). A high beam lamp 38 is configured to illuminate at a time of illumination of a high beam lamp, and a lamp such as an HISS (registered trademark: theft preventing device) lamp 39 is configured to blink at a time of actuation of a theft preventing device. An ABS lamp 40 is configured to illuminate at a time of an abnormality of an ABS (Anti-lock Brake System) or the like. A right direction indicator lamp 41 is configured to blink at a time of operation of a right direction indicator.

Figure 3:
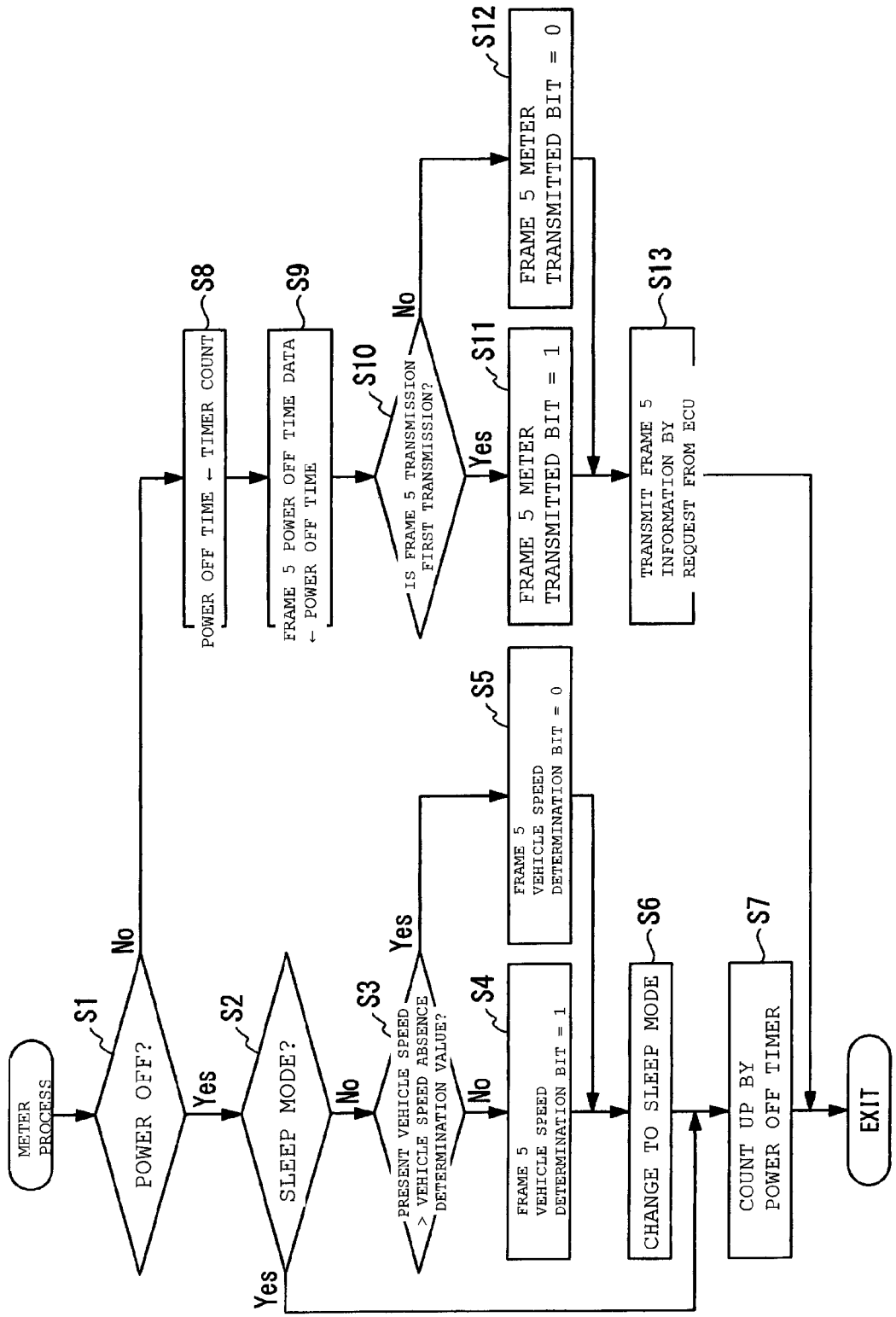
FIG. 3 is a flowchart of a process in a meter ECU in the oil warning system.

As shown in FIG. 3, the meter ECU 11 performs the following process to obtain various kinds of information for sensing a break in the oil warning system.

First, in step S1, it is determined whether the ignition switch 7 (main power supply) is off. In a case of YES (the ignition switch 7 is off) in step S1, whether a transition has been made to the sleep mode is determined in step S2. In a case of NO (not in the sleep mode) in step S2, whether a present vehicle speed is higher than a vehicle speed absence determination value (a vehicle speed such that an oil pump within the engine does not generate an oil pressure (≈0 km/h)) is determined in step S3. In a case of YES (in the sleep mode) in step S2, the process proceeds to step S7 to count up a time after the ignition switch 7 is turned off (duration of the sleep mode).

In a case of NO (vehicle speed absence) in step S3, a vehicle speed determination bit=1 is set in a predetermined storage area in step S4. In a case of YES (vehicle speed presence) in step S3, on the other hand, a vehicle speed determination bit=0 is set in the storage area in step S5. After one of these steps, a transition is made to the sleep mode in step S6. That is, present vehicle speed information is set before the sleep mode is started, and then a transition is made to the sleep mode.

Such a meter ECU 11 (meter control section 12) can be said to have a vehicle speed absence determining section for determining whether there is no vehicle speed during the OFF state of the ignition switch 7.

Thereafter, the time after the ignition switch 7 is turned off (duration of the sleep mode) is counted up in step S7. This time measurement information and the present vehicle speed information are set as data for transmission to the ECU 3 when the ignition switch 7 is turned on.

In a case of NO (the ignition switch 7 is on) in step S1, the time counted in step S7 is set to a timer count in step S8, and the timer count is set in the storage area in step S9. Thereafter, whether information transmission from the storage area to the ECU 3 is a first transmission is determined in step S10. In a case of YES (first transmission) in step S10, a transmitted bit=1 is set in the storage area in step S11. In a case of NO (transmitted) in step S10, a transmitted bit=0 is set in the storage area in step S12.

Such a meter ECU 11 (meter control section 12) can be said to have a first information transmission determining section for determining whether information transmission to the ECU 3 at a time of turning on the ignition switch 7 again is a first transmission.

After one of these steps (after determining whether the information transmission is a first transmission and setting the information), the information set in the storage area is transmitted in response to a request from the ECU 3 in step S13.

Figure 4:
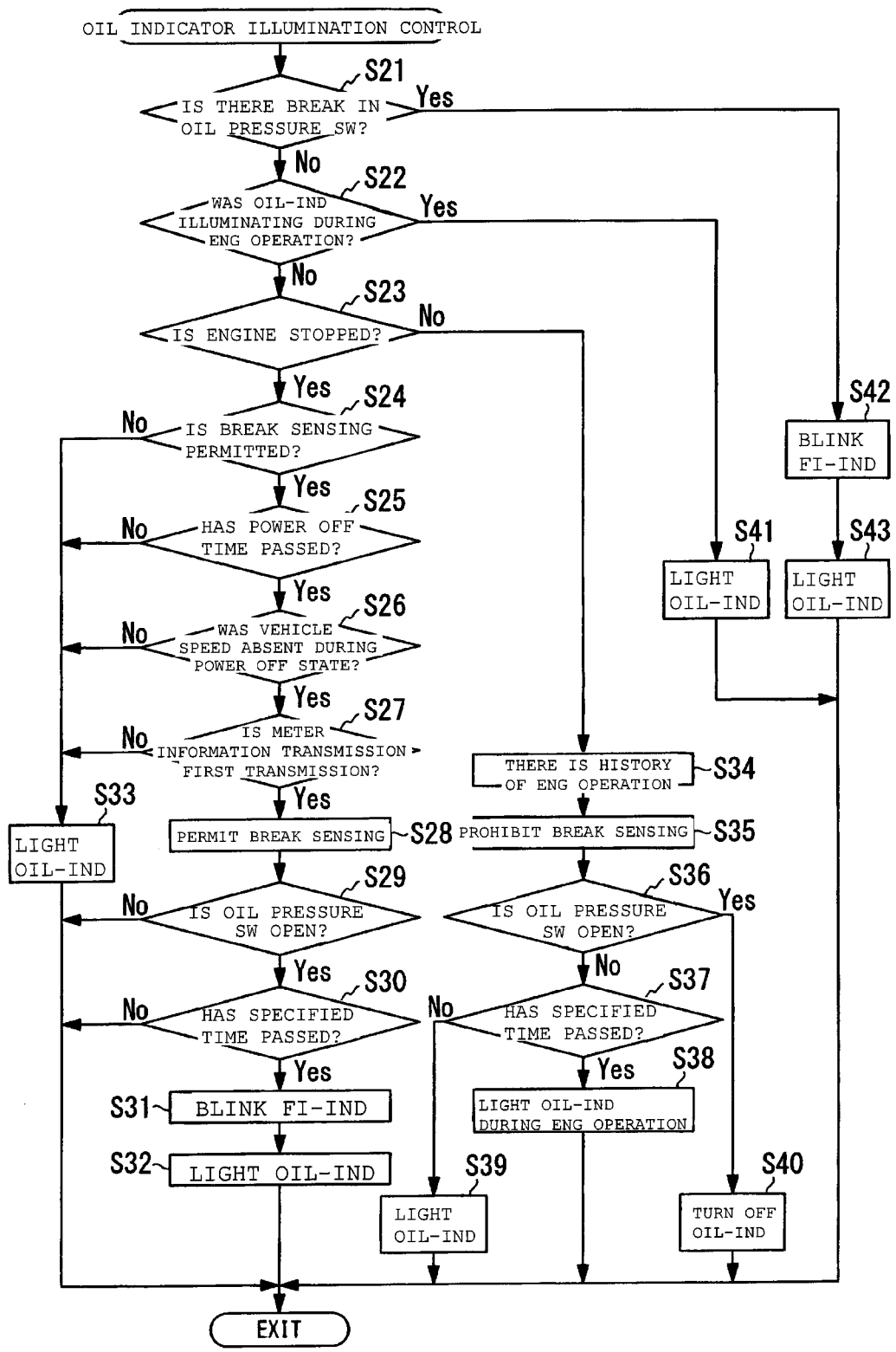
FIG. 4 is a flowchart of a process in an engine ECU in the oil warning system.

As shown in FIG. 4, the ECU 3 performs the following process for example to sense a break or failure in the oil warning system at a time of power supply (turning on power) as a result of the ignition switch 7 being turned on.

First, whether a break in the oil pressure switch 2 is sensed is determined in step S21. This determination is made according to whether the process performed up to a previous time confirmed a break in the system of the oil pressure switch 2. When such a confirmation has not been made, a result of determination in step S21 is always NO (no break or no lamp illumination), and the process proceeds to step S22. Incidentally, such a confirmation remains without being reset until a predetermined canceling process is performed.

In step S22, whether the oil pressure warning lamp 35 was illuminating during the operation of the engine 1 is determined. This determination is also made according to whether the process up to the previous time confirmed an abnormal oil pressure or a ground short. When such a confirmation has not been made, a result of determination in step S22 is always NO (no lamp illumination), and the process proceeds to step S23. Incidentally, such a confirmation and determination also remains without being reset until a predetermined canceling process is performed.

In step S23, it is determined whether the engine 1 is in an engine stop state (is stopped). In a case of YES (engine stop state) in step S23, whether break sensing for the oil pressure switch 2 is permitted is determined in step S24. This determination is made according to whether there is a history of operation of the engine 1 after the ignition switch 7 is turned on. When there is a history of operation of the engine 1, break sensing is prohibited (NO in step S24). When there is no history of operation of the engine 1, break sensing is permitted (YES in step S24).

The history of operation of the engine 1 is reset when the ignition switch 7 is turned off. A result of determination in step S24 is always YES in an engine stop state immediately after the ignition switch 7 is turned on. Incidentally, "in a case of NO in step S24," the engine 1 may be stopped while the ignition switch 7 remains on after the engine 1 is started, for example. In such a case, break sensing is stopped, and only normal illumination of the oil pressure warning lamp 35 is performed (step S33).

When break sensing is permitted in step S24, whether a predetermined time has passed since an immediately preceding OFF state of the ignition switch 7 is determined in step S25. This determination is made on the basis of time measurement information (timer count) obtained by the meter ECU 11 during the sleep mode.

In a case of YES (predetermined time has passed) in step S25, whether the vehicle has been in a vehicle speed absence determination state during the OFF state of the ignition switch 7 is determined in step S26. This determination is made on the basis of vehicle speed information (vehicle speed bit 0 or 1) obtained by the meter ECU 11 during the sleep mode.

Incidentally, in a case of NO (predetermined time has not passed) in step S25, there may be a remaining oil pressure within the engine 1. Thus, break sensing is stopped, and only normal illumination of the oil pressure warning lamp 35 is performed (step S33). That is, the ECU 3 (control section 5) can be said to have a remaining oil pressure absence determining section for determining whether the vehicle is set in the remaining oil pressure absence state during the OFF state of the ignition switch 7.

In a case of YES (no vehicle speed) in step S26, whether transmission of meter information is a first transmission is determined in step S27. This determination is made on the basis of information transmission information (transmitted bit 0 or 1) obtained by the meter ECU 11 during the sleep mode. Incidentally, in a case of NO (vehicle speed presence) in step S26, an oil pressure may be generated with the vehicle running by inertia while in gear during the OFF state of the ignition switch 7, for example. Thus, break sensing is stopped, and only normal illumination of the oil pressure warning lamp 35 is performed (step S33). That is, the ECU 3 (control section 5) can be said to have an oil pressure generation absence determining section for determining whether the vehicle is set in the oil pressure generation absence state during the OFF state of the ignition switch 7.

In a case of YES (first transmission) in step S27, the permission of break sensing is confirmed in step S28. On the other hand, in a case of NO (transmitted) in step S27, break sensing is stopped, and only normal illumination of the oil pressure warning lamp 35 is performed (step S33). This is for the following reasons. When an operation of turning off power to the ECU 3 is performed by the kill switch 7a, and the engine 1 is stopped, the meter ECU 11 does not go into the sleep mode, so that time measurement and vehicle speed determination during the stop of the engine 1 are not performed in the meter ECU 11. Thus, when the ECU 3 requests time measurement information and vehicle speed information at a first time of communication with the meter ECU 11 to perform break sensing at a time of the operation of turning on the power to the ECU 3 being performed by the kill switch 7a again, the meter ECU 11 sends previous information to the ECU 3, so that erroneous detection may occur. That is, the ECU 3 (control section 5) can be said to have a reception regulation determining section for regulating information reception from the meter ECU 11.

After the permission of break sensing is confirmed in step S28, whether the oil pressure switch 2 is in an open state is determined in step S29. In a case of YES (the oil pressure switch 2 is opened) in step S29, whether the open state of the oil pressure switch 2 has continued for a specified time (for example 1.5 seconds) is determined in step S30. Incidentally, in a case of NO (the oil pressure switch 2 is closed) in step S29, the process proceeds to step S33, where only normal illumination of the oil pressure warning lamp 35 is performed.

In a case of YES (specified time has passed) in step S30, the oil pressure switch 2 is in an open state even though the oil pressure switch 2 is under conditions for being in a closed state. It is thus determined that the system of the oil pressure switch 2 is in a break failed state. In this case, the FI lamp 34 is blinked in step S31 and the oil pressure warning lamp 35 is lit in step S32 to inform the surroundings that the system of the oil pressure switch 2 is in a break state. Incidentally, in a case of NO (specified time has not passed) in step S30, it is determined that the system of the oil pressure switch 2 has a momentary break, and the process is ended. That is, the ECU 3 (control section 5) can be said to have a break determining section for sensing a break in the system of the oil pressure switch 2.

Once the determination that the oil pressure switch 2 has a break is confirmed, a result of determination in step S21 in a subsequent process is always YES, and the subsequent process proceeds to steps S42 and S43 to blink the FI lamp 34 and light the oil pressure warning lamp 35.

That is, the oil pressure warning lamp 35 and the FI lamp 34 individually illuminate or blink at a time of a decrease in oil pressure or an FI abnormality, whereas the FI lamp 34 blinks at the same time as the illumination of the oil pressure warning lamp 35 when the system of the oil pressure switch 2 is in a failed (break) state. The operating conditions of the lamps 34 and 35 are shown in the following Table 1.

TABLE 1

| OIL PRESSURE SW | ENG STATE | OIL-IND | FI-IND |
| --- | --- | --- | --- |
| FAILED STATE (BREAK) | ENGINE STOP OPERATING | ILLUMINATES | BLINKS |
| NORMAL STATE | ENGINE STOP OPERATING | ILLUMINATES OFF | OFF OFF |

Returning to the description of step S23, when a result of determination in this step S23 is NO (the engine 1 is in an operating state), a flag indicating that there is a history of operation of the engine 1 is set in step S34, break sensing is prohibited in step S35, and whether the oil pressure switch 2 is in an open state is determined in step S36. In a case of YES (the oil pressure switch 2 is opened) in step S36, the process proceeds to step S40 to turn off the oil pressure warning lamp 35. In a case of NO (the oil pressure switch 2 is closed) in step S36, on the other hand, whether this state has continued for a specified time (for example 0.5 seconds) is determined in step S37.

In a case of YES (specified time has passed) in step S37, it is determined that the vehicle is in a failed state of an abnormal oil pressure or a ground short, and the oil pressure warning lamp 35 continues being lit while the engine 1 is operating (step S38). Incidentally, in a case of NO (specified time has not passed) in step S37, the oil pressure warning lamp 35 is lit (step S39). However, in this case, there is a possibility of the oil pressure becoming stable and the oil pressure switch 2 being opened after the passage of the specified time. That is, the ECU 3 (control section 5) can be said to have a failed state determining section for sensing an abnormal oil pressure or a ground short.

Once the determination of an abnormal oil pressure or a ground short is confirmed, a result of determination in step S22 in a subsequent process is always YES, and the process proceeds to step S41 to light the oil pressure warning lamp 35. Because an abnormal oil pressure and a ground short in the system of the oil pressure switch 2 during the operation of the engine 1 cannot be distinguished from each other, the present embodiment only lights the oil pressure lamp. When this state has continued for a predetermined time during the operation of the engine 1, the illuminating state of the oil pressure warning lamp 35 is retained in the subsequent process.

Figure 5:
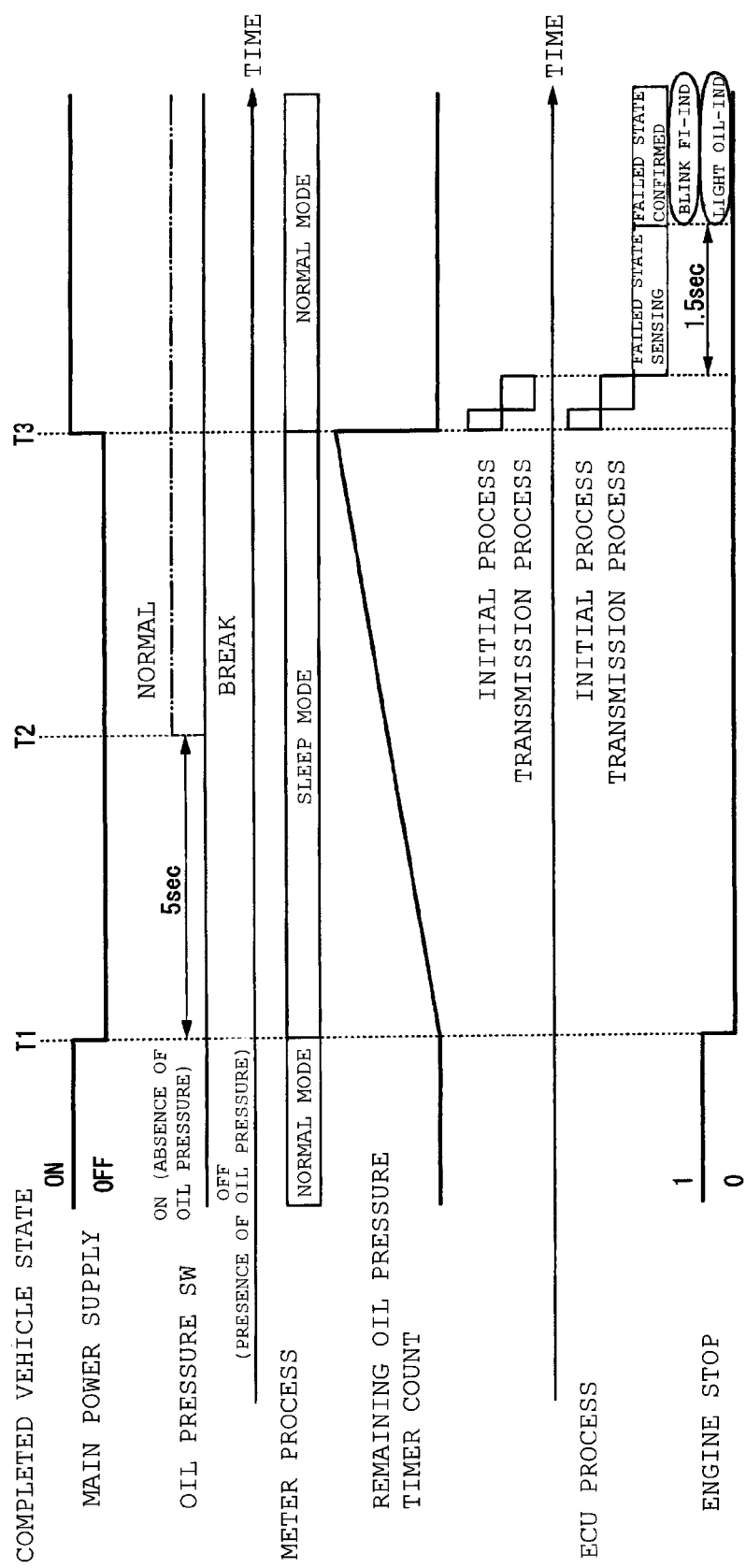
FIG. 5 is a timing chart of a completed vehicle state, the meter ECU process, and the engine ECU process in the oil warning system.

A timing chart of FIG. 5 has a time axis as the abscissa. In timing T1, the ignition switch 7 is turned off, the meter ECU 11 makes a transition from a normal mode to the sleep mode and starts a timer count of a remaining oil pressure (above steps S6 and S7), and the ECU 3 resets the history of operation of the engine 1 and permits break sensing (above steps S24 and S28).

In timing T2, the remaining oil pressure within the engine 1 should decrease and the normally closed oil pressure switch 2 should change from an OFF state to an ON state a predetermined time (for example five seconds) later after timing T1 (normal time). When a break or failure occurs in the system of the oil pressure switch 2, however, the oil pressure switch 2 remains off without being turned on after the predetermined time passes.

In timing T3, the ignition switch 7 is turned on again, the meter ECU 11 returns from the sleep mode to the normal mode, and the timer count is stored as a power OFF time in a predetermined storage area (above steps S8 and S9), and the stored power OFF time is subjected to initial processing and transmission processing and then transmitted to the ECU 3 (above step S13). At this time, the ECU 3 performs initial processing and reception processing, receives the power OFF time from the meter ECU 11, and performs break sensing after confirming that there is no remaining oil pressure.

In the break sensing, whether the oil pressure switch 2 is in an open state (oil pressure presence) is determined (above step S29). When the oil pressure switch 2 is in an open state, whether this state has continued for a specified time (for example 1.5 seconds) is determined (above step S30). When the time of the open state is equal to or more than the specified time, it is determined that the oil pressure switch 2 is in a break failed state, the oil warning lamp is lit, and the FI lamp 34 blinks (above steps S31 and S32).

As described above, the oil pressure sensor fault sensing device for a vehicle in the foregoing embodiment can include the oil pressure switch 2 for detecting an oil pressure of an engine oil of the engine 1 as a driving source of the vehicle, and the ECU 3 for controlling operation of the engine 1. The ECU 3 performs fault sensing for the oil pressure switch 2. The time measuring section (meter control section 12) functions as a sleep mode even while power to the ECU 3 is off. The time measuring section measures a stop time of the engine 1 during the sleep mode, and transmits information on the stop time to the ECU 3 when the power to the ECU 3 is turned on. When the ECU 3 determines that the stop time of the engine 1 is a predetermined time or more on a basis of the information from the time measuring section to perform the fault sensing for the oil pressure switch 2 in a state of the engine 1 not generating an oil pressure, the ECU 3 performs the fault sensing for the oil pressure switch 2.

According to this constitution, in the vehicle having the time measuring section (meter device 20) that originally has a sleep mode function, the time measuring section always performs time measurement. Therefore the power OFF time of the ECU 3 (the stop time of the engine or a time during which no oil pressure is generated) can be measured without increasing parts and the like. Thus, even when the ECU 3 does not have a dedicated time measuring section or a dedicated power supply for measuring the stop time of the engine 1, the stop time of the engine 1 can be measured accurately, and a state in which no oil pressure remains can be sensed. Thus, the fault sensing for the oil pressure switch 2 can be performed immediately after the engine 1 is restarted, and a result of fault determination can be notified to a user.

In addition, in the oil pressure sensor fault sensing device for a vehicle, the ECU 3 performs the fault sensing for the oil pressure switch 2 when determining that vehicle speed is absent during the stop time of the engine 1. When the vehicle runs by inertia or the like in an in-gear state, for example, an oil pressure is generated even during the stop time of the engine 1. However, fault determination for the oil pressure switch 2 can be made correctly by performing the fault sensing only when it is determined that vehicle speed is absent during the stop time of the engine 1.

Further, in the oil pressure sensor fault sensing device for a vehicle, the ECU 3 performs the fault sensing for the oil pressure switch 2 when determining that information transmission from the time measuring section is a first transmission after the engine 1 is started. When information at a time of a previous engine stop is erroneously transmitted to the ECU 3 at a time of a restart after an engine stop not involving an operation of turning off the ignition switch 7, for example, correct fault sensing cannot be performed. However, fault determination for the oil pressure switch 2 can be made correctly by avoiding the fault sensing when the information transmission from the time measuring section is not a first transmission.

The oil pressure sensor fault sensing device for a vehicle further includes a kill switch 7a for only stopping the engine 1, the kill switch 7a being disposed separately from the ignition switch 7. The ECU 3 stops the fault sensing for the oil pressure switch 2 when the engine 1 is restarted immediately after the engine 1 is stopped by the kill switch 7a. Therefore, information at a time of a previous engine stop is prevented from being erroneously transmitted to the ECU 3 at a time of a restart after an engine stop by the kill switch 7a which engine stop does not involve an operation of turning off the ignition switch 7. Thus, fault determination for the oil pressure switch 2 can be made correctly.

It is to be noted that the constitution in the foregoing embodiment is an example of the present invention, is of course applicable not only to motorcycles but also to three-wheel or four-wheel vehicles, and is susceptible of various changes without departing from the spirit of the invention.

DESCRIPTION OF REFERENCE SYMBOLS

1 Engine (internal combustion engine)
2 Oil pressure switch (oil pressure sensor)
3 ECU
7 Ignition switch (main switch)
7a Kill switch (engine stop switch)
12 Meter control section (time measuring section)

The invention claimed is:

1. An oil pressure sensor fault sensing device for a vehicle, the oil pressure sensor fault sensing device comprising:
an oil pressure sensor configured to detect an oil pressure of an engine oil of an internal combustion engine as a driving source of the vehicle;
an ECU configured to control operation of said internal combustion engine, the ECU configured to perform fault sensing for said oil pressure sensor; and
a time measuring section functioning as a sleep mode even while power to said ECU is off;
wherein said time measuring section is configured to measure a stop time of said internal combustion engine during said sleep mode, and to transmit information on the stop time to said ECU when the power to the ECU is turned on
wherein when said ECU determines that the stop time of said internal combustion engine is at least a predetermined time on a basis of the information from said time measuring section to perform the fault sensing for said oil pressure sensor in a state of said internal combustion engine not generating an oil pressure, said ECU is configured to perform the fault sensing for said oil pressure sensor; and
wherein said ECU is configured to perform the fault sensing for said oil pressure sensor when it is determined that vehicle speed is absent during the stop time of said internal combustion engine.

2. The oil pressure sensor fault sensing device for the vehicle according to claim 1,
wherein said ECU is configured to perform the fault sensing for said oil pressure sensor when it is determined that information transmission from said time measuring section is a first transmission after said internal combustion engine.

3. The oil pressure sensor fault sensing device for the vehicle according to claim 1, further comprising an engine stop switch configured to stop said internal combustion engine, the engine stop switch being disposed separately from a main switch,
wherein said ECU is configured to perform the fault sensing for said oil pressure sensor at a time of an engine restart immediately after an engine stop is effected by the engine stop switch.

4. An oil pressure sensor fault sensing method for a vehicle, for performing fault sensing for an oil pressure sensor configured to detect an oil pressure of an engine oil of an internal combustion engine as a driving source of the vehicle by an ECU configured to control operation of said internal combustion engine, the oil pressure sensor fault sensing method comprising:
measuring a stop time of said internal combustion engine during a sleep mode and transmitting information on the stop time to said ECU when power to said ECU is turned on, by a time measuring section functioning as said sleep mode even while the power to said ECU is off; and
when said ECU determines that the stop time of said internal combustion engine is at least a predetermined time on a basis of the information from said time measuring section to perform the fault sensing for said oil pressure sensor in a state of said internal combustion engine not generating an oil pressure, said ECU is configured to perform the fault sensing for said oil pressure sensor; and
wherein said ECU is configured to perform the fault sensing for said oil pressure sensor when it is determined that vehicle speed is absent during the stop time of said internal combustion engine.

5. An oil pressure sensor fault sensing device for a vehicle, the oil pressure sensor fault sensing device comprising:
pressure sensor means for detecting oil pressure of an engine oil of an internal combustion engine;
controlling means for controlling operation of the internal combustion engine, the controlling means for performing fault sensing for the pressure sensor means; and
measuring means for measuring time, said measuring means functioning as a sleep mode while the controlling means is off,
wherein the measuring means is also for measuring a stop time of the internal combustion engine during the sleep mode, and for transmitting information on the stop time to the controlling means when power to the controlling means is on, and wherein the controlling means is also for determining that the stop time of the internal combustion engine is at least a predetermined time on a basis of the information from the measuring means to perform fault sensing for the pressure sensor means in a state of the internal combustion engine not generating an oil pressure, whereby said controlling means performs fault sensing for the pressure sensor means; and wherein the controlling means performs the fault sensing for the pressure sensor means when it is determined that vehicle speed is absent during the stop time of the internal combustion engine.

6. The oil pressure fault sensing device of claim 5, wherein the controlling means performs the fault sensing for the pressure sensor means when it is determined that information transmission from the measuring means is a first transmission after the internal combustion engine is started.

7. The oil pressure fault sensing device according to claim 5, further comprising stop means for stopping the internal combustion engine, the stop means being disposed separately from a main switch, wherein the controlling means stops the fault sensing for the pressure sensor means at a time of an engine restart immediately after an engine stop is effected by the stop means.

* * * * *